United States Patent
Hatfalvi et al.

(10) Patent No.: US 7,240,193 B2
(45) Date of Patent: Jul. 3, 2007

(54) SYSTEMS AND METHODS THAT PROVIDE EXTERNAL NETWORK ACCESS FROM A PROTECTED NETWORK

(75) Inventors: Emil J. Hatfalvi, Ellicott City, MD (US); James G. Noble, Springfield, VA (US)

(73) Assignee: INVICTA Networks, Inc., Vienna, VA (US)

( * ) Notice: Subject to any disclaimer, the term of this patent is extended or adjusted under 35 U.S.C. 154(b) by 1018 days.

(21) Appl. No.: 10/085,130

(22) Filed: Mar. 1, 2002

(65) Prior Publication Data
US 2002/0129281 A1    Sep. 12, 2002

Related U.S. Application Data

(60) Provisional application No. 60/272,053, filed on Mar. 1, 2001, provisional application No. 60/272,055, filed on Mar. 1, 2001.

(51) Int. Cl.
H04L 9/00 (2006.01)
(52) U.S. Cl. .......... 713/154; 713/153
(58) Field of Classification Search .......... 709/217; 726/23
See application file for complete search history.

(56) References Cited

U.S. PATENT DOCUMENTS

| | | |
|---|---|---|
| 5,835,726 A | 11/1998 | Shwed et al. |
| 6,081,900 A | 6/2000 | Subramaniam et al. |
| 6,088,796 A | 7/2000 | Cianfrocca et al. |
| 6,948,003 B1 * | 9/2005 | Newman et al. ............ 709/250 |
| 6,981,146 B1 * | 12/2005 | Sheymov ..................... 713/172 |
| 2002/0069369 A1 * | 6/2002 | Tremain ..................... 713/201 |
| 2002/0095522 A1 * | 7/2002 | Hayko et al. ............... 709/311 |

FOREIGN PATENT DOCUMENTS

GB    2 316 206 A    2/1998

OTHER PUBLICATIONS

Vesna Hassler et al; "Controlling Applets' Behavior in a Browser"; Information Systems Institute Technical University of Vienna, Vienna, Austria; 1998 IEEE; pp. 120-125.
Oct. 4, 2004 International Search Report for EP 02 72 1204.
Dahlia Malkhi, et al.; "Secure Execution of Java Applets Using a Remote Playground"; AT&T Labs Research, Florham Park, NJ; 1988 IEEE; pp. 40-51.

(Continued)

Primary Examiner—Nasser Moazzami
Assistant Examiner—Pramila Parthasarathy
(74) Attorney, Agent, or Firm—Carlos R. Villamar; Nixon Peabody, LLP (57) ABSTRACT

A user who is connected to an unprotected network via a protected network is able to browse the Internet without concern that unauthorized code will execute within their local workstation as the result of a vulnerability within the browser executing on a special virtual machine or a browser module. Any unauthorized code will only affect one of a special virtual machine or a browser module.

24 Claims, 4 Drawing Sheets

OTHER PUBLICATIONS

John Pescatore; "Secure Use of the World Wide Web: Keeping Browsers and Servers From Getting Snared"; Trusted Information System; ISBN# 0-7803-3277-6; pp. 36-38.

RSA Security; "Are Passwords Really Free? A Closer Look at the Hidden Costs of Password Security"; pp. 1-8.

International Search Report for PCT/US02/06018, mail date Jul. 11, 2002.

Packard, Keith "*X Display Manager Control Protocol*" Version 1.0 X Consortium Standard, X Version 11, Release 6.4, X Consortium, Laboratory for Computer Science, Massachusetts Institute of Technology, 24 pages.

Scheifler, Robert W. "*X Window System Protocol*" X Consortium Standard, X Version 11, Release 6.4, X Consortium, Inc., 164 pages.

* cited by examiner

SYSTEMS AND METHODS THAT PROVIDE EXTERNAL NETWORK ACCESS FROM A PROTECTED NETWORK

RELATED APPLICATION DATA

This application claims the benefit of and priority to U.S. Application Ser. No. 60/272,055, entitled "Apparatus and Method to Provide Internet Access For A Protected Network By A Dedicated Browser Computer," filed Mar. 1, 2001, and U.S. Application Ser. No. 60/272,053, entitled "Apparatus and Method to Provide Internet Access From A Protected Network By A Tunnelled Communications Path," filed Mar. 1, 2001, both of which are incorporated herein by reference in their entirety.

BACKGROUND OF THE INVENTION

1. Field of the Invention

The systems and methods of this invention generally relate to network security. Specifically, the systems and methods of this invention provide secure access to an external network or computer from a protected network or computer.

2. Description of Related Art

On a private or limited-access protected network, there is a need to provide access to one or more external networks or computers, such as "Internet access," to user workstations for purposes such as browsing, file transfer, etc. (collectively "browsing"). Current browsers run on a user workstation or personal computer and require direct or proxy access to the Internet. This creates a mechanism for the introduction of malicious code onto the user workstation or personal computer.

Further, malicious code on a user workstation likewise has direct or proxy access to the Internet, raising the possibility of confidential or proprietary information being transmitted to the Internet or external network without the knowledge of the user.

SUMMARY OF THE INVENTION

The exemplary systems and methods of this invention provide external network access, such as Internet access, for a protected network by a dedicated browser. Specifically, an exemplary embodiment of the present invention provides Internet access for users on a private or limited-access/protected network (hereinafter the "protected network") to the Internet or other network off the protected network by dedicating a browser module(s) to execute the Internet browser and other Internet access programs. The browser module has limited access to the protected network, sufficient to communicate with browser clients on one or more user workstations of the protected network. This provides a mechanism to protect the protected network and the user computer(s) from viruses, worms, trojan horses, and all forms of unauthorized code encountered while accessing the Internet. Furthermore, the browser module prevents unauthorized code on the protected network from communicating with the Internet. The browser module and the browser client module communicate via a restricted protocol. Between the browser module and the protected network is an optional browser isolator module, which can restrict the network communications, such as ethernet communications, to specifically that protocol necessary to support the remote Internet access on the protected computer.

In accordance with a second exemplary embodiment of this invention, the systems and methods provide external network access, such as Internet access, for users on a private or limited-access/protected network to the Internet or other network off the protected network by running Internet-accessing programs, e.g., browser programs, ftp programs, telnet programs, Voice over IP programs, streaming media programs, or the like, on a special virtual machine on the user workstation. This special virtual machine provides a tunnelled and authenticated communications path from the browser to a border module which then provides access to the Internet. The authenticated tunnel from the special virtual machine to the border module prevents unauthorized code on any workstation on the protected network from accessing the border module and thereby accessing the Internet.

Accordingly, an exemplary aspect of the systems and methods of this invention is to provide security to a protected network.

Aspects of the present invention also relate to computer security. In particular, the exemplary embodiments of the systems and methods of this invention relate to providing secure access to an unprotected network.

Aspects of the present invention also relate to monitoring communication to ensure the communications are performing in an authorized manner.

Aspects of the present invention also relate to providing a simulated environment via which communication with an unprotected network can be accomplished, thereby protecting the protected environment.

These and other features and advantages of this invention are described in or are apparent from the following detailed description of the embodiments. For example, the systems and methods of this invention can be used in conjunction with copending U.S. application Ser. No. 09/571,377, entitled "Method of Communications and Communication Network Intrusion Protection Methods And Intrusion Attempt Detection System," U.S. application Ser. No. 09/862,477, entitles "Systems And Methods For Communication Protection," U.S. application Ser. No. 09/867,442, entitled "Systems And Methods For Distributed Network Protection," U.S. application Ser. No. 09/925,503, entitled "Systems And Methods For Distributed Network Protection," entitled "Systems and Methods For Creating a Code Inspection System," filed Feb. 14, 2002, all of which are incorporated herein by reference in their entirety.

BRIEF DESCRIPTION OF THE DRAWINGS

The embodiments of the invention will be described in detail, with reference to the following figures wherein.

Appendix A illustrates exemplary pseudo code for performing connectivity and filtering for communications to/from the protected network to an external network.

DETAILED DESCRIPTION OF THE INVENTION

Figure 1:
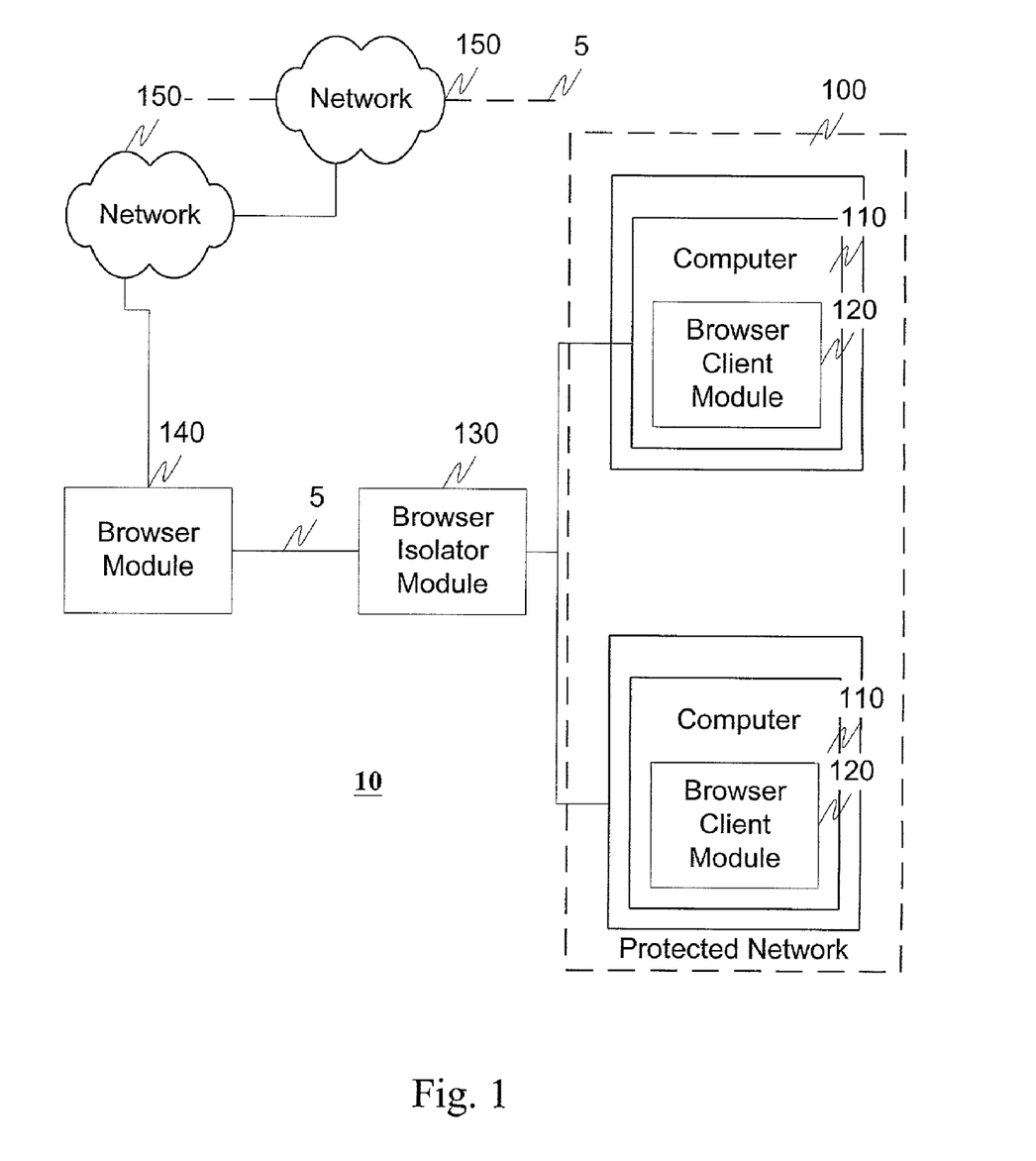
FIG. 1 is a functional block diagram illustrating an exemplary browser module according to this invention.

FIG. 1 illustrates an exemplary browser interface system 10 that provides Internet access for a protected network through a browser module. Specifically, the browser interface system 10 comprises one or more protected networks 100, one or more protected computers 110, comprising a browser client module 120, a browser isolator module 130, a browser module 140, and one or more networks 150, all connected by links 5.

While the exemplary embodiments illustrated herein show the various components of the browser interface system and restricted tunneling system collocated, it is to be appreciated that the various components of these systems can be located at distant portions of a distributed network, such as a local area network, a wide area network, a telecommunications network, an intranet and/or the Internet or within a dedicated browser interface system or restricted tunneling system. Thus, it should be appreciated that the components of these systems can be combined into one or more devices or collocated on a particular node of a distributed network, such as a protected network. As will be appreciated from the following description, and for reasons of computational efficiency, the components of these systems can be arranged at any location within a distributed network without affecting the operation of the system.

Additionally, it is to be appreciated that the term module as referenced herein refers to hardware or software of any combination thereof that is capable of performing the functionality associated with the particular element(s).

Furthermore, it should be appreciated that the various links 5 connecting the elements can be wired or wireless links, or a combination thereof, or any known or later developed element(s) that is capable of supplying and/or communicating data to and from the connected elements.

Additionally, it should be appreciated that while various functional components are illustrated, various other components, such as input and output devices, firewalls, network security devices, or the like, can also be included without affecting the operation of these systems.

The protected network 100 includes a plurality of protected computers 110, two of which are shown for purposes of illustration. The protected computers 110 in the protected network 100 are connected to a browser module 140 via a browser isolator module 130.

The browser module 140 is connected to one or more external networks 150 and provides its Internet-access services to the one or more protected computers 110 on the protected network 100. The browser module 140 is separate and physically distinct from the protected computers 110. The protected computers 110 on the protected network 100 each have a browser client module 120 that communicates with the browser module. Any browser-executed code operates not on the protected computer, but rather on the browser module 140. The browser module(s) is/are sacrificial, in that if unauthorized code is encountered and executed in the process of Internet access, only the browser module 140 is corrupted, and that module can be, for example, taken off-line until repaired. Thus the protected computer 110 and data/programs thereon are not corrupted.

Optionally, another browser module (not shown) may serve in the absence of the corrupted browser module. The browser module 140 may have software/hardware installed to detect anomalies caused by unauthorized code and may optionally shut itself down automatically. The browser module 140 can also have logically separate access to both the external network 150 and the protected network 100. The browser module 140 protocol-level access to the protected network can also be limited to that specifically necessary to support authorized protected computer 110 access.

The protected computer's 110 access to the protected network is limited to those communications specifically necessary for the remote operation of the browser module 140 and the user feedback (audio and visual) of the same. Other communications are generally prohibited. This isolation can be accomplished in hardware and/or software. For example, the protocol can involve a TCP connection initiated by the protected computer to the browser module 140 acting as a "server." The browser module 140 could then not permit TCP connections initiated by an unprotected computer directed towards a protected computer 110 on the protected network. Likewise, the specific TCP ports which can be addressed in either direction could be limited to those required by the browser client module 120. In this manner, damage to computers on the protected network is further prevented in the case of a compromised browser module 140. This function can be accomplished in software and/or hardware on the protected computer 110, or, for greater security, in hardware between the protected computer and the protected network. The hardware configuration has the advantage of not being corruptible by unauthorized code inadvertently loaded onto the browser computer. The hardware device can also have a separate network connection (not shown) for each side (the browser computer and the protected network) and could act as a restrictive router between the two.

The browser client module 120 on the protected computer 110 provides the user with the control of and the visual and/or audio output of the actual browser operating remotely on the browser module 140. This operates analogously to robotic manipulators used in handling dangerous materials, e.g., explosives, except that the browser is operated remotely on a sacrificial browser computer, e.g., the browser module 140, and the audio and video appears as if it would to a local browser on the protected computer 110.

Additionally, the user(s) may download files from the Internet just as they normally would from a local browser. However, in this case, the files are initially downloaded onto the browser module 140.

The browser module 140 and browser isolator module 130 prevent unauthorized access to the protected network 100. The browser isolator module 130 prevents communications between the browser module 140 and the protected network 100 other than those particular authorized messages necessary for the remote operation of the protected computer 110. Thus, the ability of a compromised browser module 140 to adversely affect the protected computers 110 on the protected network 100 is minimized.

Unauthorized code brought onto the protected network via another mechanism, e.g., a user's floppy disk, is prevented from direct access to the Internet, since only the browser client module 120 on the protected computer 110 can communicate with the browser module 140. The browser isolator module 130 is also capable of restricting this communication. Similarly, individual users are prevented from direct access to the Internet, except as provided by the browser client module 120 and the protected computer 110. The browser client module 120 and the protected computer 110 may also both monitor the characteristics of the user's browser communications with the browser module 140 to validate that it is indeed not being manipulated by, for example, a user-computer-resident unauthorized code. The browser module may also periodically validate that an actual person is controlling the browser client module 120.

One exemplary implementation of the systems and methods of this invention uses two network protocols from the X-Windows system: The "X Window System Protocol" (the X protocol) by the X Consortium Standard, X Version 11, Release 6.4, and the "X Display Manager Control Protocol" (the XDMCP protocol), by the X Consortium Standard X Version 11, Release 6.4, both of which are incorporated herein by reference in their entirety. However, it is to be appreciated that any protocol/system/software can be used with equal success that allows a first computer to execute and control applications that run on a second computer.

These are both client/server protocols and are used together to allow a user on one computer to execute and control applications that run on another computer. In the context of FIG. 1, the user is working at one of the protected computers 110 and executes and controls applications that run on the browser module 140 by means of the X and XDMCP protocols. The applications run by the user on the protected computer 110 can be any applications supported by that computer system, including those that access the Internet. The browser isolator module 130 ensures that communication with the protected computer 110 is restricted to these two protocols.

In order for a user working at one of the protected computers 110 to execute applications on the browser module 140, an X-Windows session is established between the two computers. The first step towards this goal is accomplished by the XDMCP protocol. For this protocol, the protected computer 110 is the client and the browser module 140 is the server. The protected computer 110 starts by sending an XDMCP request to the browser module 140 requesting that it establish an X-Windows session with the protected computer. The browser module 140 responds by indicating its willingness to establish an X-Windows session and, assuming it is willing, several more XDMCP requests and responses are exchanged. In a successful scenario this results in the browser module 140 initiating an X-Windows session with the protected computer 110.

When the browser module 140 establishes an X-Windows session with the protected computer 110, the user can be authenticated through the browser module's login process, e.g. providing a username and password, to gain access to the browser module 140. Once authentication is validated, the user will be able to execute applications on the browser module 140.

What has been described thus far is just the normal operation of the XDMCP and X protocols. One focus of this invention is the operation of the browser isolator module 130, which scrutinizes the network communications between the protected computer 110 and the browser module 140. The selected protocols of the X-Windows system have the attribute that that they do not transfer data between computers other than that necessary for the user interface. The user interface data is temporary in that it is transferred across the network and used to generate the interface shown to the user, but is not stored permanently. This is unlike the Internet File Transfer Protocol (FTP), which copies the contents of files from one computer to another and permanently stores the copies on the receiving computer. By restricting communication with the protected computer 110 to these two X-Windows protocols, the browser isolator module 130 prevents the transfer of permanent data between one or more of the protected computers 110 and the browser module 140, and from there the external network 150.

If the browser isolator module 130 only restricted communications with the browser module 140 to certain protocols, the browser isolator module 130 would be nothing more than a simple firewall. However, the browser isolator module 130 not only restricts communication to the XDMCP and X protocols, it can examine each protocol packet in detail, inspecting one or more predetermined fields in the packets to ensure that each field contains valid, e.g., authorized, information. Beyond verifying that each field contains valid information, fields with related information can be compared within and between packets in the protocol session to ensure that there is a consistent relationship during the life of the session. Individual field contents can also be verified in a variety of ways depending on the type of the field.

For example, text fields can be checked against a list of expected values where known. If a text field is not restricted to a list of known values, it may still have a predictable pattern to which it should conform, e.g., a capital letter followed by three decimal digits. If so, this can be checked and enforced. At a minimum, text fields can be checked to ensure that they are composed of, for example, printable characters. In general, any information can be checked to insure the information is what is expected to for particular communication and/or environment.

For example, several XDMCP packets can contain a field with one or more Authorization Names. Field values can be checked against a list of known values that consists of the strings "MIT-KERBEROS-4", "MIT-KERBEROS-5", "MIT-MAGIC-COOKIE-1", "SUN-DES-1", "XC-QUERY-SECURITY-1", and "XDM-AUTHORIZATION-1." Any Authorization Name that does not match one of the values in this list can be rejected.

Numeric fields either can have a restricted set of values or can be unconstrained. Fields with a restricted set of values can be checked against the restricted set. Some numeric fields can have unconstrained values but a fixed length that can also be checked.

The value of one field can restrict the permitted values or length of another field. These relationships can be enforced both within a packet and between packets. Some fields are expected to have the same value over a long period of time, even spanning system restarts.

The exemplary purpose of these detailed packet field checks by the browser isolator module 130 is two-fold. By ensuring that the fields contain only valid, consistent information, the browser isolator module 130 reduces the chances that a defect in the protocol implementation on either the browser module 140 or a protected computer 110 can be exploited by unauthorized software. The checks for data consistency also reduce the possibility that packet fields can be used to surreptitiously transfer data by varying their contents over time.

For example, during the XDMCP packet exchange the protected computer can specify an X-Windows display number, which has legal values between 0 and 63. When the browser module initiates the X-Window session with the protected computer it does so on a TCP port number that is derived from the display number (display number plus 6000). The display number specified in the XDMCP packets can be stored in a profile for that user's workstation. When the browser module starts the X-Windows session can must use the TCP port that corresponds to the display number or the connection can be rejected.

Appendix A provides a high-level description of the exemplary processing logic that can be applied to one or more packets sent to or sent from the browser module 140. For example, the following information can be screened to determine of the communication is authorized: source and destination ports, user information, direction of information, host information, destination information, character information, IP address information, display identification, session information, display class, display number, TCP information, date and/or time information, or the like. In general, an information communicated between the browser and the browser client can be used. Furthermore, there are a plurality of options that can be invoked upon determining that one or more packets are authorized including deleting the packet, further analyzing the packet, determining the origin of the packet of the like.

Figure 2:
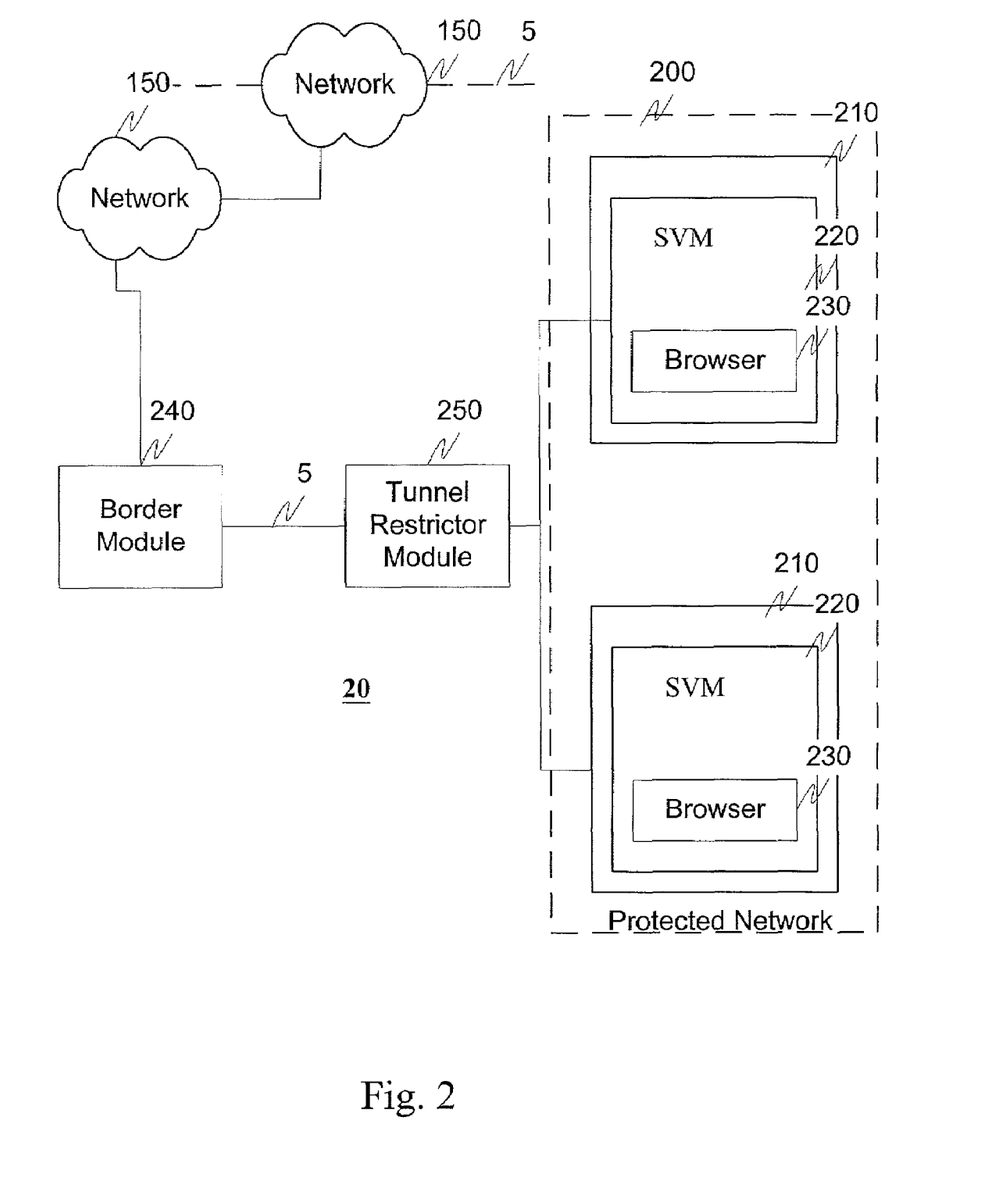
FIG. 2 is a functional block diagram illustrating an exemplary tunnelled communications path according to this invention.

Alternatively, or in conjunction with the above, the systems and methods of this invention can provide Internet access from a protected network 200 by a tunnelled communications path. As illustrated in FIG. 2, the protected network 200 comprises one or more protected computers 210, two of which are shown for purposes of illustration. Each protected computer 210 comprises a special virtual machine (SVM) 220 having a browser 230. The browser 230 for each protected computer 210 communicates with the external network 150, such as the Internet by means of a border module 240.

The browser 230 can be any browser which runs on a virtual machine or an emulated machine. For example, the browser 230 could be a browser written in Java® running on a Java® Virtual Machine or a Windows®-based browser running in a "virtual PC," or, in general, any browser not running in a "native mode" on the user workstation.

The special virtual machine 220 can be a traditional virtual machine (VM), such as a Java® VM, which has had its communications ability modified so as to tunnel and authenticate all network communications to the border module 240. The normal network communications ability of the VM would traditionally allow an application direct local network and Internet access in a straightforward manner, for example by creating sockets, sending and receiving packets, etc. The communications protocol stacks of the SVM 220 are modified so that all communications are tunnelled and authenticated to the border module 240 for transmission to/from the external network 150. This tunnelling and authentication is transparent to the browser 230 and any other applications running on the SVM. Any application running on the virtual machine, such as a browser, Internet Relay Chat, e-mail, streaming media, or the like, would appear to have direct access to the external network. Applications running on the SVM would have no access to the protected network or its traffic, since all network communications paths are tunnelled to the border module 240. Applications on the protected computer 210 other than the SVM 220 would not have access to the external network since they would lack access to the authenticated tunnel.

The border module 240 is a component which has at least two logical and/or physical network connections: one to the protected network 200 and another to the external network 150. The border module 240 encapsulates and tunnels inbound external network communications to the end-user workstations' SVMs on the protected network 200. Outbound traffic from the SVMs 220 is authenticated, de-capsulated, and forwarded to the external network 150 as normal traffic. The authentication of the communications between the SVM 220 and the border module 240 prevents unauthorized or unauthorized native code anywhere on the protected network from accessing the external network 150, since only the SVM 220 has the authentication necessary to accomplish the transfer of the restricted data. Generally, unauthorized code on the SVM 220 is not prevented from accessing the external network 150. However, if the SVM 220 acquires unauthorized code, such as a virus or trojan horse, the unauthorized code would not have access to the information on the protected network 200, and the SVM 220 could simply be re-loaded, reset, or the like, for example, automatically or by a user, thus removing the unauthorized code.

To further enhance the security of the protected network 200, an optional tunnel restrictor module 250 may be placed between the border module 240 and the protected network 200. The tunnel restrictor module 250 can limit the border module's access to the protected network 200 to those communications specifically necessary for the tunnelled communications with the SVM's on the protected computers 210 on the protected network 200.

Other communications can be prevented bi-directionally by the tunnel restrictor module 250. This isolation can be accomplished in hardware and/or software, by a unit placed between the border module and the protected network. This unit could have at least two network interfaces: one for the protected network side, and one for the border processor side. For example, the tunnel protocol could involve a TCP connection initiated by the SVM 220 on a user workstation to the border module 240 acting as the "server." The tunnel restrictor module 250 could then not permit TCP connections initiated by the border module 240 directed towards a user workstation 210 on the protected network 200. Likewise, the specific TCP or UDP ports which can be addressed in either direction would be limited to those required by the SVM. In this manner, damage to computers on the protected network is further prevented in case of a compromised border module 240. Likewise, external e-mail may also be sent or received via the browser 230 running on the SVM 220.

The border module 240 tunnels and thereby encapsulates outside traffic as it travels on the protected network 200 to the special virtual machines 220. Therefore, outside access to the protected computer 210 and to the normal traffic of the protected network 200 is prevented. The tunnel restrictor module 250 further prevents access to the protected network 200 from the external network 150 should the border processor module 240 be compromised.

Unauthorized code brought onto the protected network 200 via another mechanism, such as a user's floppy disk, is prevented from direct access to the Internet, since only the special virtual machine 220 on the protected computer 210 can communicate with the border module 240, and thereby the external network. The optional tunnel restrictor module 250 can also prevents this type of communication. Similarly, individual users are prevented from direct access to the Internet, except as provided by the browser 230 or other software on the special virtual machine 220.

Figure 3:
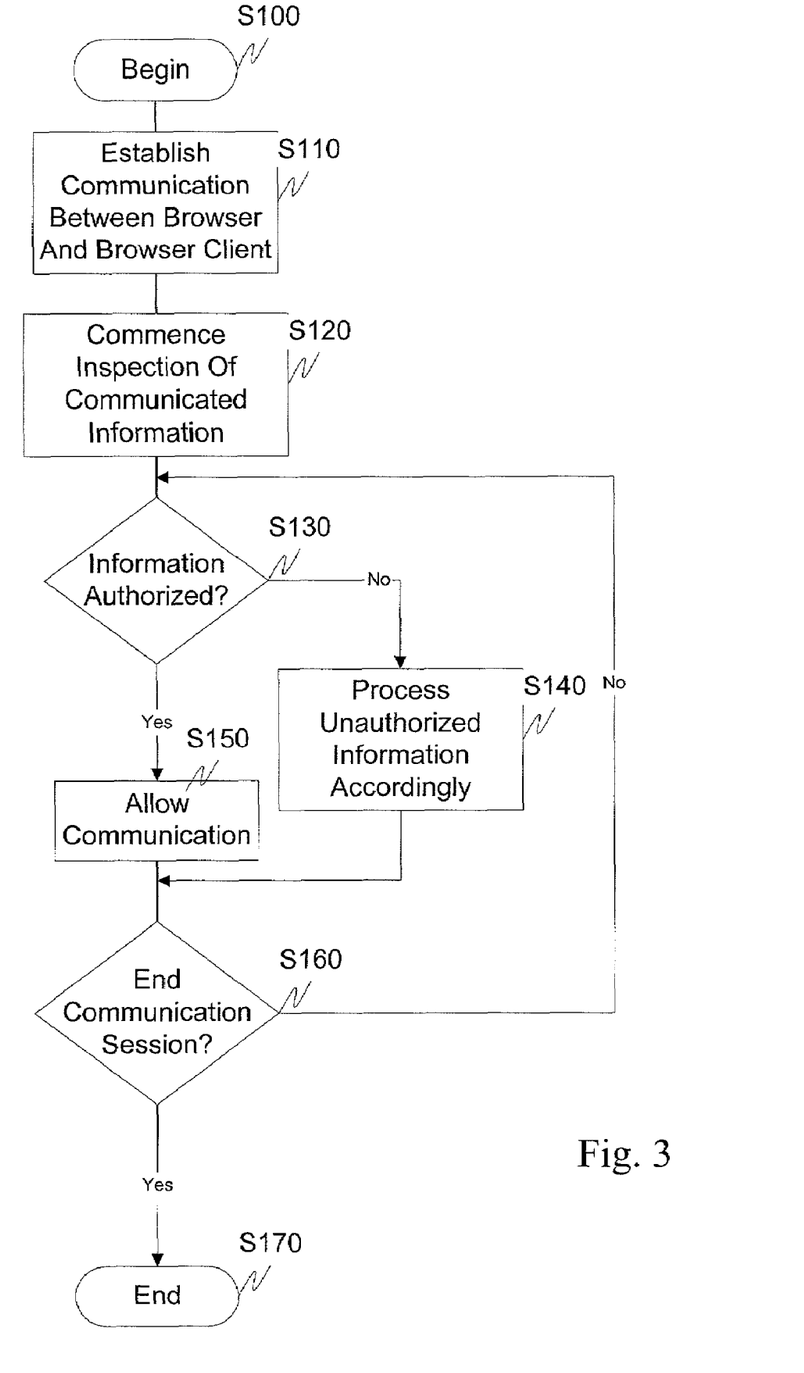
FIG. 3 illustrates an exemplary method of operating the browser interface system according to an embodiment of this invention.

FIG. 3 illustrates an exemplary method of operating the browser interface system according to this invention. In particular, control begins in step S100 and continues to step S110. In step S110, communications are established between the browser and the browser client. Next, in step S120, communications between the browser and the browser client are inspected. Then, in step S130, a determination is made whether the communications are authorized.

If the communications are authorized, control jumps to step S150. Otherwise, control continues to step S140. In step S140, the unauthorized information is processed in accordance with a predetermined procedure. Control then continues to step S160.

In step S150, the authorized communications are allowed. Control then continues to step S160.

In step S160, a determination is made whether to end the communication session. If the session is complete, control continues to step S160 where the control sequence ends. Otherwise, control jumps back to step S130.

Figure 4:
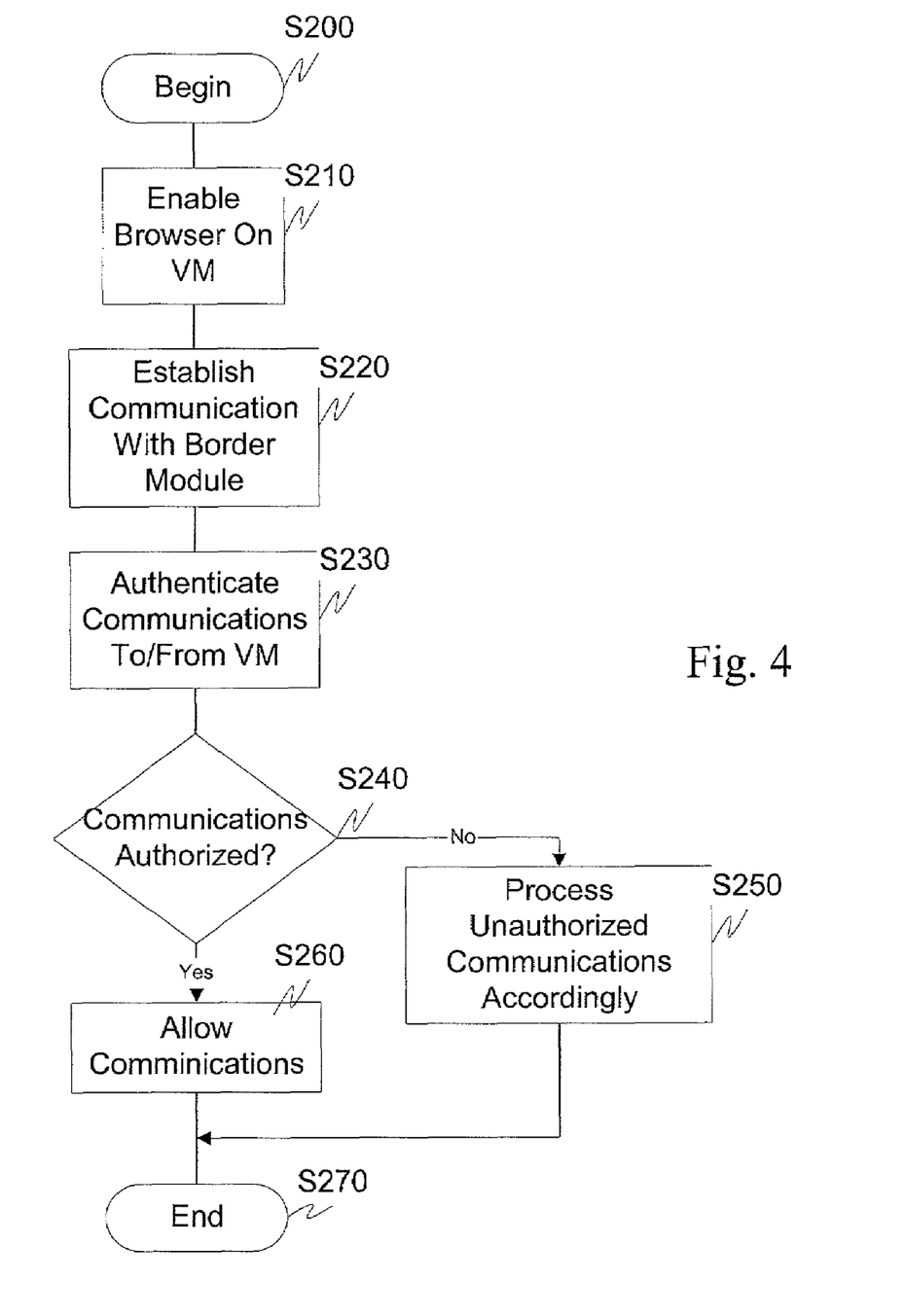
FIG. 4 illustrates an exemplary method of establishing a tunnelled communications path according to an exemplary embodiment of this invention.

FIG. 4 outlines an exemplary method of establishing and monitoring a tunnelled communications path according to an exemplary embodiment of this invention. Specifically, control begins in step S200 and continues to step S210. In step S210, the browser of the virtual machine is enabled. Next, in step S220, communications between the browser of the virtual machine and the border module are established. Then, in step S230, the communications to/form the virtual machine are authenticated. Control then continues to step S240.

In step S240, a determination is made whether the communications are authorized. If the communications are authorized, control jumps to step S260 where the communications are allowed. Otherwise, control continues to step S250.

In step S250, the unauthorized communications are processed accordingly. Control then continues to step S270 where the control sequence ends.

As shown in FIGS. 1-2, the browser interface system and restricted tunneling system can be implemented either on a single programmed general purpose computer or a separate programmed general purpose computer. However, the browser interface system and restricted tunneling system can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmable logic device such as PLD, PLA, FPGA, PAL, or the like. In general, any device capable of implementing a finite state machine that is in turn capable of implementing the attached pseudo-code and performing the steps in the accompanying flowcharts can be used to implement the browser interface system and restricted tunneling system according to this invention.

Furthermore, the disclosed method may be readily implemented in software using object or object-oriented software development environments that provide portable source code that can be used on a variety of computer or workstation hardware platforms. Alternatively, the disclosed browser interface system and restricted tunneling system can be implemented partially or fully in hardware using standard logic circuits or VLSI design. Whether software or hardware is used to implement the systems in accordance with this invention is dependent on the speed and/or efficiency requirements of the system, the particular function, and the particular software and/or hardware systems or microprocessor or microcomputer systems being utilized. However, the browser interface system and restricted tunneling system and methods illustrated herein can be readily implemented in hardware and/or software using any known or later-developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer, such as a JAVA® or CGI script, as a resource residing on a server or workstation, a routine embedded on a dedicated browser interface system and restricted tunneling system, a web browser, a PDA, a dedicated browser interface system, a dedicated restricted tunneling system, or the like. The browser interface system and restricted tunneling system can also be implemented by physically incorporating the system into a software and/or hardware system, such as the hardware and software systems of a computer workstation or dedicated browser interface system and restricted tunneling system.

It is, therefore, apparent there has been provided in accordance with the present invention, systems and methods for protecting a protected network. While this invention has been described in conjunction with a number of embodiments, it is evident that many alternatives, modifications, and variations would be or are apparent those of ordinary skill in the applicable art. Accordingly, the invention is intended to embrace all such alternatives, modifications, equivalents and variations that are within the spirit and scope of this invention.

We claim:

1. A browser interface system for protecting a computer network, comprising:
    a browser module that provides communications access to an unprotected network from a protected network, wherein said browser module is separate and physically distinct from protected computers;
    a browser client module that communicates with the browser module, wherein said browser client module provides control of video and audio output of a browser operating remotely on said browser module; and
    a browser isolator module that analyzes communications between the browser module and the browser client module,
    wherein said browser isolator module prevents unauthorized communications between the browser module and the browser client module, and
    said browser isolator module prevents the transfer of permanently stored data between the protected computers and the browser module, and between the protected computers and the unprotected network.

2. The system of claim 1, wherein the communication between the browser module and the browser client module is limited to those communications specifically necessary for remote operation of the browser module.

3. The system of claim 2, wherein the browser isolator module screens at least one of the following types of information to determine if the communication is authorized:
    source and destination ports, user information, origination information, host information, destination information, character information, IP address information, display identification, session information, display class, display number, TCP information, and date and/or time information.

4. The system of claim 1, wherein the browser module comprises a distributed network browser.

5. The system of claim 1, wherein the protected network is isolated from unauthorized communications received from the unprotected network.

6. The system of claim 1, wherein any browser-executed code operates on the browser module.

7. The system of claim 1, wherein said browser module is sacrificial and protects the protected computers from unauthorized content.

8. The system of claim 1, wherein said browser isolator module performs detailed field checks and reduce the chance of defect in the protocol implementation on either the browser module or the protected computer.

9. A method for providing a browser interface system for protecting a computer network, said method comprising:
    providing communications access to an unprotected network from a protected network via a browser module, wherein the browser module is separate and physically distinct from protected computers;
    communicating with the browser module through a browser client module, wherein said browser client module provides control of video and audio output of a browser operating remotely on said browser module;

analyzing communications between the browser module and the browser client module via a browser isolator module;

preventing unauthorized communications between the browser module and the browser client module via the browser isolator module; and said browser isolator module preventing the transfer of permanently stored data between the protected computers and the browser module and between the protected computers and the unprotected network.

10. The method of claim 9, further comprising limiting the communication between the browser and browser client module to those communications specifically necessary for remote operation of the browser module.

11. The method of claim 10, further comprising screening at least one of the following types of information to determine if the communication is authorized:

source and destination ports, user information, origination information, host information, destination information, character information, IP address information, display identification, session information, display class, display number, TCP information, and date and/or time information.

12. The method of claim 9, said browser module further comprising a distributed network browser.

13. The method of claim 9, further comprising isolating the protected network from unauthorized communications received from the unprotected network.

14. The method of claim 9, further comprising operating any browser-executed code on the browser module.

15. The method of claim 9, further comprising protecting the protected computer from unauthorized content, wherein said browser module is sacrificial.

16. The method of claim 9, said browser isolator module performing detailed field checks, said field checks reducing the chance of defect in the protocol implementation on either the browser module or protected computer.

17. A computer program product for providing a browser interface system for protecting a computer network, and including one or more computer-readable instructions embedded on a computer readable storage medium and configured to cause one or more computer processors to perform the steps of:

providing communications access to an unprotected network from a protected network via a browser module, wherein the browser module is separate and physically distinct from protected computers;

communicating with the browser module through a browser client module, wherein said browser client module provides control of video and audio output of a browser operating remotely on said browser module;

analyzing communications between the browser module and the browser client module via a browser isolator module;

preventing unauthorized communications between the browser module and the browser client module via the browser isolator module; and preventing the transfer of permanently stored data between the protected computers and the browser module, and between the protected computers and the unprotected network.

18. The computer program product of claim 17, comprising further instructions embedded on the computer readable storage medium and configured to cause the one or more computer processors to perform the step of limiting the communication between the browser and browser client module to those communications specifically necessary for remote operation of the browser module.

19. The computer program product of claim 18, comprising further instructions embedded on the computer readable storage medium and configured to cause the one or more computer processors to perform the step of screening at least one of the following types of information to determine if the communication is authorized:

source and destination ports, user information, origination information, host information, destination information, character information, IP address information, display identification, session information, display class, display number, TCP information, and date and/or time information.

20. The computer program product of claim 17, comprising further instructions embedded on the computer readable storage medium and configured to cause the one or more computer processors to perform the step of said browser module further comprising a distributed network browser.

21. The computer program product of claim 17, comprising further instructions embedded on the computer readable storage medium and configured to cause the one or more computer processors to perform the step of isolating the protected network from unauthorized communications received from the unprotected network.

22. The computer program product of claim 17, comprising further instructions embedded on the computer readable storage medium and configured to cause the one or more computer processors to perform the step of operating any browser-executed code on the browser module.

23. The computer program product of claim 17, comprising further instructions embedded on the computer readable storage medium and configured to cause the one or more computer processors to perform the step of protecting the protected computer from unauthorized content, wherein said browser module is sacrificial.

24. The computer program product of claim 17, comprising further instructions embedded on the computer readable storage medium and configured to cause the one or more computer processors to perform the step of performing detailed field checks, said field checks reducing the chance of defect in the protocol implementation on either the browser module or protected computer.

* * * * *